Jan. 28, 1964    H. B. OPFERKUCH    3,119,307
AUTOMATIC BACKLASH ELIMINATOR
Filed Oct. 14, 1960    2 Sheets-Sheet 1

INVENTOR.
Heinz B. Opferkuch
BY
Cyril M. Hajewski
Attorney

INVENTOR.
Heinz B. Opferkuch
BY Cyril M. Hajewski
Attorney

United States Patent Office 3,119,307
Patented Jan. 28, 1964

3,119,307
AUTOMATIC BACKLASH ELIMINATOR
Heinz B. Opferkuch, West Allis, Wis., assignor to Kearney & Trecker Corporation, West Allis, Wis., a corporation of Wisconsin
Filed Oct. 14, 1960, Ser. No. 62,621
8 Claims. (Cl. 90—22)

This invention relates generally to a backlash eliminator and more particularly to an improved structure for eliminating backlash in a drive mechanism.

It is a general object of the present invention to provide an improved backlash eliminator especially adapted to remove the backlash from a relatively rotatable screw and nut drive mechanism.

Another object of the present invention is to provide an improved backlash eliminator for removing the backlash in a screw and nut mechanism that is connected to drive a movable member of a machine tool.

Another object of the present invention is to provide an improved backlash eliminator that responds automatically to external forces applied to a movable member of a machine tool to vary the tightness between a screw and its cooperating nut which are connected to drive the movable member in its path of travel.

Another object is to provide an improved backlash eliminator that is automatically operable, when required, to effect tight engagement between a relatively rotating screw and nut but which will readily release the tight engagement between the nut and screw, without binding, when the necessity for such tightness is eliminated, so that relative rotation between the screw and nut may then be effected upon the application of a minimum of torque.

A further object is to provide an improved backlash eliminator that is extremely efficient in operation but of simple and inexpensive construction.

According to this invention, a machine tool, for example, a milling machine having a table reciprocating transmission such as a screw and nut assembly, is adapted to perform both conventional cutting and climb cutting operations by providing apparatus for eliminating backlash in a nut and screw drive, and to develop a frictional resistance to the relative rotation of the screw and nut upon the application of an external force on the table which tends to move the table ahead of its transmission. The nut assembly comprises two nut elements which are rotatably supported by a bracket and are in threaded engagement with the screw. The two nut elements are interconnected by suitable gearing so that rotation of either one of them will cause rotation of the other in the opposite direction. When a climb cutting force on the machine tool table tends to produce relative rotation between the nut assembly and screw and cause the unit to overrun the drive, frictional forces are produced which operate to cause rotation of the nut elements in a direction to effect their axial movement against their supporting bracket and thereby place the portion of the screw between them in tension to eliminate backlash and develop sufficient friction between the threads of the nut assembly and the threads of the screw to resist relative rotation between the nut assembly and screw with sufficient strength to prevent the climb cutting forces from causing the transmission to overrun its drive. When the climb cutting forces are terminated, the mechanism operates automatically to relieve the high frictional forces between the threads and thereby enable relative rotation between the nut assembly and the screw to be effected with a minimum of resistance.

In order to facilitate the release of the tight frictional engagement between the nut assembly and screw an overrunning or one way clutch is provided between each of the two nut elements and the screw. The hub of each of the overrunning or one way clutches is connected to rotate with its cooperating nut element and in one direction of rotation the clutch housing will rotate with the clutch hub while in the opposite direction the clutch hub will rotate relative to the housing. The clutches are arranged so that when the nut elements are rotated in a direction to produce their axial movement toward the supporting bracket, the clutch housings rotate with the nut elements and as they are forced by the nut elements against the bracket they produce a sliding friction with the surface of the bracket which limits the tightening up process of the backlash eliminating mechanism. Upon the completion of a climb cutting operation, the continued operation of the drive mechanism produces rotation of the nut elements relative to the bracket in the opposite directions to back them away from the bracket for releasing the tight frictional engagement with the threads of the screw. The clutch hubs rotate with the nut elements but do so relative to the clutch housings so that it is not necessary to overcome the friction which exists between the clutch housings and the bracket. As the nut elements are initially backed away from the bracket, the pressure on the clutch housings toward the bracket is removed to relieve the friction between the surfaces of the clutch housings and the bracket so that the clutch housings may subsequently readily rotate with the nut elements.

The foregoing and other objects of the invention, which will become more fully apparent from the following detailed specification, may be achieved by the particular apparatus described herein by way of example as illustrating a preferred embodiment of the invention, in connection with the accompanying drawings, in which.

Figure 1:
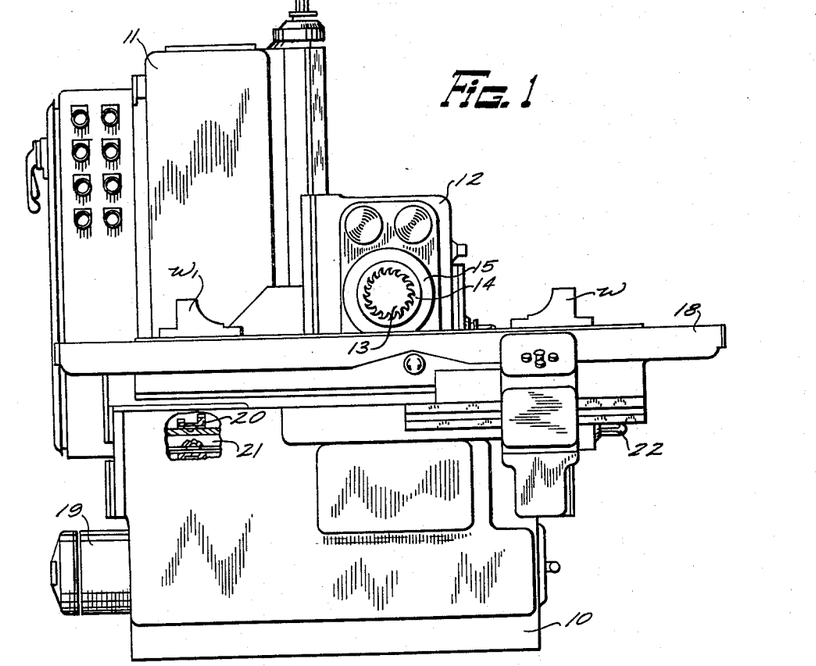
FIGURE 1 is a front elevational view of a milling machine in which the features of the present invention have been incorporated.

Referring more particularly to the drawings and specifically to FIG. 1 thereof, the milling machine there shown comprises essentially a hollow bed or base 10 that constitutes the main frame or foundation of the machine and forms a housing for the driving mechanism and control apparatus associated therewith. Upstanding from the rear of the base 10 is a column 11 on which a spindle head 12 is slidably mounted for bodily vertical movement. The spindle head 12 rotatably supports a cutting tool 13 secured in a tool spindle 14, rotatably mounted in a quill 15.

Power for rotating the spindle 14 to drive the cutting tool 13 carried thereby is derived from a motor (not shown) mounted in the hollow bed or base 10 of the machine and operatively connected, by means of speed changing gearing and direction reversing mechanism (not shown), to effect rotation of the spindle in either direction and at a selected speed, in the usual well known manner.

On the upper surface of the bed 10 in front of the column structure, a table or work supporting element 18 is guided for reciprocating horizontal sliding movement along the bed, in a path transverse to the axis of the tool spindle 14, to provide means for moving workpieces W and W1 in cooperating relationship with the cutting tool 13.

Power for reciprocating the table 18 is derived from a motor 19 carried by the base 10 and transmitted to a gear cluster 20 that is connected to rotate a table screw 21 having a right-hand thread, and which is journalled in the bed 10 so that it is restrained from axial movement relative to the bed. The power from the motor 19 is transmitted to the gear cluster 20 by means of suitable speed change gearing (not shown) and direction reversing mechanism (not shown) to effect rotation of the screw 21 in either direction and at a selected speed, in well known manner. The power drive to the screw 21 may be disconnected from the gear cluster 20 by shifting a lever (not shown), to a neutral position, whereby the screw 21 may be manually rotated in the conventional manner by means of a crank (not shown) which is engageable with a squared end 22 of the screw 21.

Figure 2:
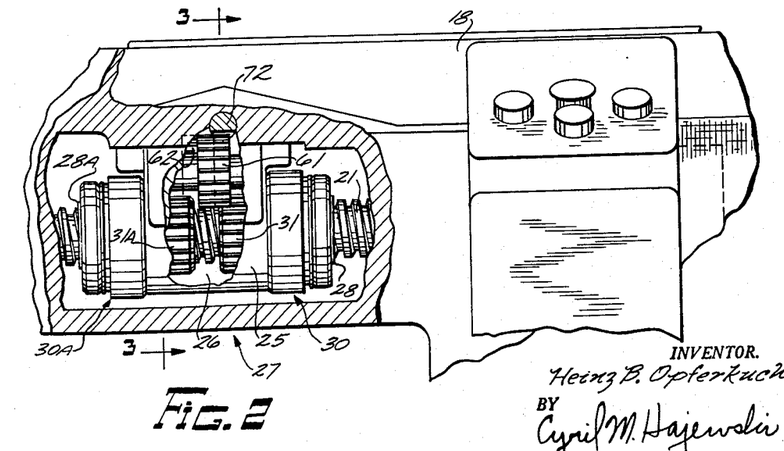
FIG. 2 is an enlarged fragmentary elevational view of the bed and table of the machine illustrated in FIG. 1 with parts broken away to show the table screw and nut assembly and a portion of the internal mechanism of the nut assembly.
Figure 3:
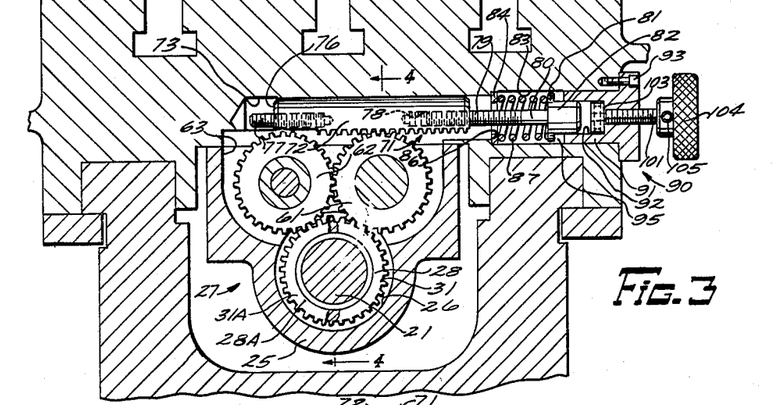
FIG. 3 is a sectional view taken along the plane represented by the line 3—3 of FIG. 2, but on an enlarged scale, showing the connecting mechanism which achieves reverse rotation of the two nut elements of the nut assembly as well as the limiting mechanism for controlling the operation of the backlash eliminating mechanism.
Figure 4:
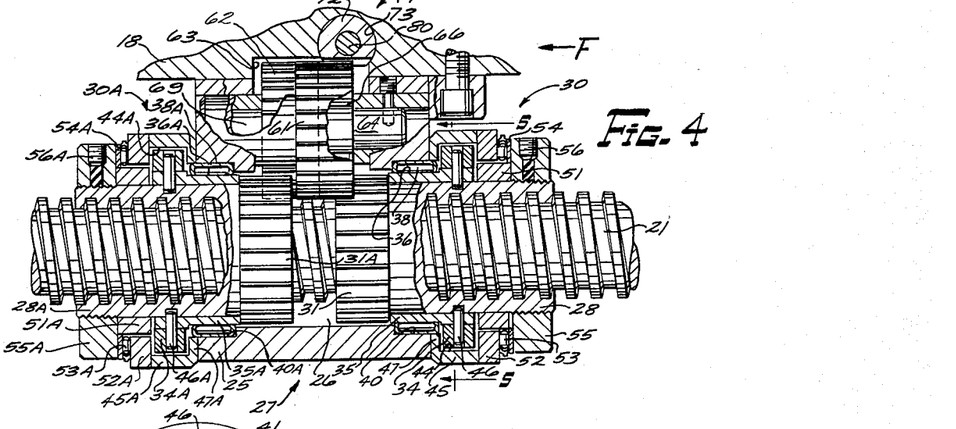
FIG. 4 is an enlarged detail view partly in vertical section and partly in elevation taken along the plane represented by the line 4—4 of FIG. 3, showing the backlash eliminating mechanism of the present invention; and, FIG. 5 is an enlarged view in vertical section through the overrunning or one way clutch associated with the right-hand nut element, as viewed in FIG. 4, and taken along the plane represented by the line 5—5 in FIG. 4.

As shown in FIGS. 2, 3 and 4, the table 18 is provided with a depending bracket or abutment 25 having an opening 26 through which the screw 21 may freely pass. A nut assembly, generally identified by the reference numeral 27, is supported by the bracket 25 for movement with the table 18 and is in threaded engagement with the screw 21 so that rotation of the latter will cause the table to move in its path of travel. The nut assembly 27 comprises a pair of threaded nut elements 28 and 28A which are threadedly engaged on the screw 21. Although the screw 21 is shown rotatably mounted in the bed 10, it is to be understood other combinations can be employed. For example, the screw could be rotatably mounted in the table 18 and the abutment 25 secured to the bed 10.

As best shown in FIG. 4, the two nut elements 28 and 28A and their associated mechanisms are exactly the same. Therefore, a description of the nut element 28 will likewise apply to the nut element 28A and its associated mechanism. In identifying the various component parts, the components associated with the nut element 28A will be given the same reference numeral as is given to the corresponding components associated with the nut element 28, but the suffix letter "A" will be added to the identifying reference numerals. Although the drive is connected to rotate the screw 21 relative to the nut assembly 27 for moving the table 18, the nut elements 28 and 28A are rotatable relative to the screw 21 and relative to each other for varying the degree of tightness between the nut elements and the screw. As shown in FIG. 4, the nut element 28 is relatively long and has formed on its inwardly extending end a gear portion 31. An overrunning or one way clutch, generally identified by the reference numeral 30, is associated with the nut element 28 and is adapted to engage for rotation with the nut element 28 when the latter is rotated in a clockwise direction, as viewed from the right in FIG. 4, and to release when the nut element is rotated in the opposite or counterclockwise direction so that the nut element rotates independently of a clutch housing 45 in the counterclockwise direction. The clutch 30 is provided for the purpose of facilitating the release of the nut element 28 from its tight engagement with the screw 21 when the operation of the machine requires it.

Figure 5:
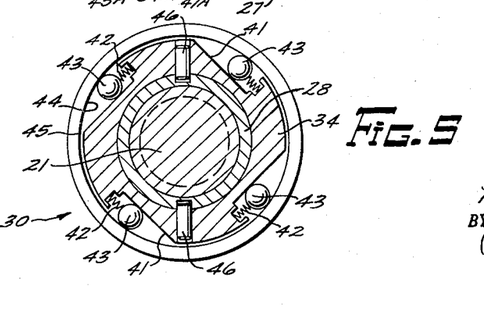

The overrunning clutch 30 may be of any suitable type, but in this instance is of a well known form which includes an inner member or hub 34 having an elongated axially extending sleeve portion 35. The hub 34 is mounted on the nut element 28 with the sleeve portion 35 extending inwardly into the opening 26 of the bracket 25 with the external diameter of the sleeve being such that it does not engage the internal surface of the opening 26. The periphery of the sleeve portion 35 is provided with a finished surface 36 that serves as the inner race of a radial antifriction bearing 38. The antifriction bearing 38 is seated within a counterbore 40 provided in the bracket 25 and serves to journal the hub 34 in the bracket 25 as well as to support the screw 21 in a horizontal position, preventing the screw from sagging. The clutch hub 34, as shown in FIG. 5, is provided with a plurality of flat surfaces 41, and springs 42 operate against rollers 43 to urge them along the surfaces 41 into engagement with an arcuate inner surface 44 of the clutch housing 45. The clutch hub 34 is secured to the nut element 28 by means of pins 46 which are inserted through suitable aligned openings, as shown in FIGS. 4 and 5. Rotation of the nut element 28 in either direction will therefore cause the clutch hub to rotate with it in the same direction with the hub rotating in the bearing 38 to minimize the frictional resistance to rotation.

The clutch housing 45 is provided with a radial inwardly extending flange portion 47 which forms a circular opening, the axis of which coincides with the axis of the housing. As shown in FIGS. 4 and 5, the circular inner edge of the flange 47 engages the antifriction bearing 38 to rotatably support the housing 45. While the flange 47 serves to mount the housing 45 on the bearing 38 it also functions as a thrust bearing, as will be subsequently described. In operation, when the nut element 28 is rotated in the clockwise direction, as viewed in FIG. 5, the hub 34 of the overrunning or one way clutch 30 will rotate with it in the same direction and the rollers 43 will be moved into frictional engagement between the surfaces 41 and 44 to transmit the drive from the hub 34 to the housing 45 thereby causing it to rotate in the same direction. Since the screw 21 is provided with a right-hand thread, rotation of the nut element 28 relative to the screw 21 in a clockwise direction, as viewed from the right in FIG. 4 or as viewed in FIG. 5, will operate to effect engagement of the face of the flange portion 47 of the housing 45 against the right end of the bracket 25 which prevents axial movement of the nut element 28 to the left, as viewed in FIG. 4. Thus, the housing 45 acts as a plain thrust bearing.

When the nut element 28 is caused to rotate in a counterclockwise direction, as viewed from the right in FIG. 4 or as viewed in FIG. 5, the clutch hub 34 will rotate with it but the rollers 43 will be moved along the supporting surfaces 41 against the pressures of the springs 42 out of driving engagement with the surfaces 44 to release the clutch housing 45 so that the nut 28 and hub 34 rotate in unison in a counterclockwise direction but independently of the housing 45. Therefore, when the clutch housing is in engagement with the bracket 25, the frictional force therebetween will tend to hold the housing stationary while the clutch hub 34 and nut element 28 rotate in the counterclockwise direction in the radial bearing 38. The nut element 28A and its associated clutch hub 34A and clutch housing 45A function in the same manner but operate in the opposite direction. That is, when the nut element 28A is rotated in a clockwise direction, as viewed from the left in FIG. 4, the rollers 43A will engage the inner surface of the clutch housing 45A to lock it to the hub thereby effecting its rotation in a clockwise direction. This action will operate to engage the face of the flange portion 47A of the clutch housing 45A with the left-hand side of the bracket 25, as viewed in FIG. 4, so that the clutch housing 45A also functions as a plain thrust bearing to oppose axial rightward movement of the nut element 28A relative to the bracket 25.

The overrunning or one way clutch 30 is maintained in operative position by means of a clutch spacer 51 that is mounted on the nut element 28 which engages the axial end face of the clutch hub 34. Loosely mounted on the spacer 51 is a thrust washer 52 that is disposed to engage the outer end face of the clutch housing 45. An antifriction thrust bearing 53 is loosely mounted on the clutch spacer 51 with the antifriction elements thereof engaging the adjacent face of the thrust washer 52. Another thrust washer 54 is loosely mounted on the extreme outer end of the clutch spacer 51 and serves as a race for the antifriction thrust bearing 53. The entire assembly is maintained in operative position on the nut element 28 by means of a collar nut 55 which is threadedly engaged on the threaded outer end of the nut element 28 and which is locked thereto by means of a suitable set screw 56 threadedly engaged in a suitable threaded opening provided in the collar nut 55. A similar arrangement is provided for maintaining the overrunning or one way clutch 30A in operative position.

When the table 18 is being moved to the left the nut element 28 acts as the motivating element because it will take the force of the screw 21 and transmit it to the bracket 25. On the other hand when the table is moved to the right, the nut element 28A acts as the motivating element, for the same reason. Thus, in conventional cutting operations, when one nut element is serving as the motivating element the other nut element is rendered inoperative so as not to impose an additional load on the screw 21, since in conventional cutting operations the cutting force imposes a load on the table which opposes table movement. However, in a climb cutting operation where the cutting force imposed on the table tends to move the table in the direction of feed, mechanism has been provided to revolve the two nut elements 28 and 28A relative to the screw 21 in opposite directions to tighten them against the bracket 25 and thereby place the portion of the screw between the two nut elements in tension. This increases the friction between the threads of the screw 21 and the threads of the nut assembly 27 which serves to prevent the climb cutting force rotating the screw so that the screw does not overrun its drive.

The mechanism of the present invention automatically adjusts the nut elements 28 and 28A in response to the forces applied to the table 18 to accommodate either a climb cutting or conventional cutting operation. As shown in FIGS. 3 and 4, the mechanism comprises a pair of pinions 61 and 62 which are in meshing engagement with each other and which respectively mesh with the gear portion 31 of the nut element 28 and the gear portion 31A of the nut element 28A. The pinion 61 is located within a suitable recess 63 formed in the bottom side of the table 18 and is mounted on a shaft 64 on an antifriction bearing 66 so that it will rotate relative to the shaft 64. Similarly, the pinion 62 is located within the recess 63 and is also antifrictionally mounted on a shaft 69 so that it is free to rotate relative to its supporting shaft 69. As a result of this gearing, rotation of the nut element 28 in one direction will effect rotation of the nut element 28A in the opposite direction so that rotation of the nut elements 28 and 28A may be effected relative to the lead screw 21 but always in opposite directions with respect to each other.

In describing the operation of the nut assemblies in conjunction with the reversing mechanism which effects opposite rotation of the nut elements it will be assumed that the nut elements are initially in the position shown in FIG. 4, with the housings 45 and 45A in engagement with opposite sides of the bracket 25. It will also be assumed that the table is about to be moved towards the right, as viewed in FIG. 1, and that the cutter 13 is rotating in a direction to effect a conventional cutting operation on the workpiece W1 and thereby develops a force F, as indicated by the arrow in FIG. 4, which opposes the direction of table movement and urges the table and its associated bracket 25 in the direction of the arrow F relative to the axially fixed screw 21.

When the table screw 21 is driven in a counterclockwise direction, as viewed from the left in FIG. 4, to effect rightward movement of the table, the conventional cutting force F urges the table 18 and the bracket 25 to the left as viewed in FIG. 4. Such force on the bracket 25 is in a direction away from the overrunning clutch 30 so that the cutting force is not applied to the nut element 28. However, this conventional cutting force F does act against the overrunning clutch 30A to urge the clutch 30A and its associated nut element 28A in a leftward direction relative to the axially fixed screw 21. This force F therefore produces a frictional engagement of the threads of the nut element 28A with the threads of the screw 21 to cause the nut element 28A to revolve with the screw 21 in a counterclockwise direction as viewed from the left in FIG. 4. This will cause rotation of the pinion 62 in a clockwise direction, as viewed in FIG. 3, to effect counterclockwise rotation of the pinion 61 which, in turn, effects clockwise rotation of the nut element 28, as viewed from the left in FIG. 4, relative to the screw 21, to cause the nut element 28 to move in an axial direction away from the bracket 25. The nut elements 28 and 28A are therefore moved away from the bracket 25 so that the portion of the screw between the two nut elements 28 and 28A is not in tension and the tight frictional engagement between the threads of the nut assembly 27 and the screw 21 is relieved to render the screw freely rotatable. However, no movement of the table 18 can be effected until the nut element 28A is held against rotation, as it is the table motivating element in this case. In order to terminate the rotation of the nut elements 28 and 28A after the tight frictional engagement between their threads and the threads of the screw 21 has been relieved, a limiting mechanism, generally identified by the reference numeral 71, has been provided to limit the amount of angular movement of the nut elements. The mechanism 71 is automatic in operation and requires no attention upon the part of the operator of the machine.

The mechanism 71 is shown in FIGS. 3 and 4, and comprises a rack 72 which is located within a transverse bore 73 provided in the table 18. The bore 73 is located so that the bottom portion thereof communicates with the recess 63 to enable the gear portion of the rack 72 to extend within the recess 63 and mesh with the pinion 61. The inner extending end 76 of the rack 72 is provided with a threaded axial opening which receives a threaded stud 77 that is adjustable relative to the rack so that the extent of inward or leftward movement of the rack as viewed in FIG. 3, may be limited as desired. The outwardly extending end or right end of the rack 72, as viewed in FIG. 3, is provided with an axial threaded opening 78 which receives a threaded end 79 of a rack plunger 80. The outer end of the plunger 80 is provided with a circular enlarged head portion 81 that has an axially extending tang 82 and is disposed within a counterbore 83. A washer 84 is mounted about the threaded end 79 of the plunger 80 and is seated against a shoulder 86 formed by the counterbore 83. Mounted about the plunger 80 is a compression spring 87 which is confined in the counterbore 83 between the washer 84 and the circular head 81 and serves to bias the plunger 80 outwardly or to the right, as viewed in FIG. 3, thereby drawing the rack 72 to the right. Inserted within the counterbore 83 is a spring tension adjusting nut 90 having an inwardly extending barrel 91 that is provided with a transverse slot 92 which is complementary to and receives the tang 82 so that rotation of the nut 90 will produce a corresponding rotation of the plunger 80. The adjusting nut 90 is provided with a radial flange which abuts the outer face of the table 18 and has a plurality of openings which receive cap screws 93, one of which is shown, that threadedly engage cooperating threaded openings provided in the table 18 to lock the adjusting nut 90 in a selected adjusted angular position. Upon removing the locking screws 93, the nut 90 may be rotated in either direction, as desired, to axially adjust the plunger 80 relative to the rack 72 so that the tension of the spring will be increased or decreased. For example, by rotating the adjusting nut 90 in a clockwise direction, as viewed from the right in FIG. 3, the plunger 80 will be rotated in a clockwise direction to thread it into the threaded opening 78 provided in the rack and thereby shift the circular head 81 toward the fixed washer 84. This action tends to compress the spring 87. On the other hand, the opposite rotation of the adjusting nut 90 will effect counterclockwise rotation of the plunger 80 to thread it outwardly of the rack 72 to move the circular head 81 away from the washer 84 for expanding the spring 84 and thereby reducing the force applied by the spring.

In setting or adjusting the mechanism 71, the rack 72 with the stud 77 extending outwardly thereof, is moved to full depth in the bore 73, until the stud 77 engages the blind end of the bore. With the rack 72 in full leftward position, the tight frictional engagement between the threads of the nut assembly 27 and the threads of the screw 21 is relieved to the desired degree. If further adjustment is required to relieve the degree of engagement between the threads or increase it during the normal operation of the machine, the mechanism 71 may be disassembled for removing the rack 72 from the bore so that the stud 77 can be readjusted accordingly until the desired thread engagement is obtained. When the desired setting of the stud 77 has been obtained, the spring 87 should be under sufficient compression so that it will react to move the rack 72 rightwardly, as viewed in FIG. 3. This will result in clockwise and counterclockwise rotation of the nut elements 28 and 28A, respectively, by operation of the pinions 61 and 62. In this direction of rotation, the clutch housings 45 and 45A rotate with the nut elements 28 and 28A, respectively, to slidably engage with the bracket 25. This action causes the threads of the nut elements 28 and 28A to frictionally engage the threads of the screw 21 so that backlash between the nut assembly 27 and the screw 21 is removed. If such reaction from the spring 87 is not obtained the plunger 80 must be adjusted relative to the rack 72 so that the head 81 of the plunger will compress the spring 87 in an amount sufficient to enable it to react to remove the backlash between the nut assembly 27 and the screw 21. The spring 87 when properly adjusted will not only remove the backlash between the nut assembly 27 and the screw 21 but will also maintain this condition when the table is moved without a cutting operation being performed.

The function of the mechanism 71 can more clearly be shown by describing its operation in conjunction with the operation of the nut elements. In FIG. 3, the rack 72 is shown in a position in which backlash between the threads of the nut elements 28 and 28A and the threads of the screw 21 has been removed. For the purpose of this explanation it will be assumed that the table 18 is moving to the right, as viewed in FIGS. 1 and 4, and that a conventional cutting operation is taking place to produce the force F which opposes table movement. In this case the screw 21 is driven in a counterclockwise direction, as viewed in FIG. 3 or from the left in FIG. 4. Since table movement is to the right the nut element 28A will act against the bracket 25 so that it is the motivating element and therefore the nut element 28 must be rendered inoperative of or have minimum friction existing between its threads and the threads of the screw so as not to impose an additional load on the screw. With the nut element 28A being the motivating element the greater frictional force will exist between it and the screw 21, therefore, it will rotate with the screw in a counterclockwise direction. The gear portion 31A of the nut element 28A having meshing engagement with the pinion 62 will cause the pinion 62 to rotate in a clockwise direction, as viewed in FIG. 3 or from the left in FIG. 4. Clockwise rotation of the pinion 62 will cause the pinion 61 to rotate in a counterclockwise direction causing the rack 72 to move leftwardly within the bore 73. The plunger 80 moving with the rack will operate to compress the spring 87. Simultaneously with counterclockwise rotation of the nut element 28A and leftward movement of the rack 72, the nut element 28 will be rotated in a clockwise direction by reason of the meshing engagement of the pinion 61 with the gear portion 31 formed on the nut element 28, and the nut element 28 will move away from the abutment 25 to relieve the tight frictional engagement between the threads of the nut element 28 and the screw 21. These movements continue until the stud 77 of the rack 72 engages the blind end of the bore 73 which acts as a positive stop to limit the angular movement of the nut elements so that a minimum amount of frictional engagement is established between the threads of the nut assembly 27 and the screw 21. Thus, the nut element 28A serves to effect table movement while the nut element 28 is rendered inoperative and offers no resistance to table movement.

As will later be more fully described, during a climb cutting operation the nut elements 28 and 28A tighten up against the bracket 25. This places the portion of the screw between the nut elements 28 and 28A in tension to remove all backlash between the threads of the nut assembly 27 and the threads of the screw 21, and increases the frictional engagement between the threads by an amount which is proportional to the force applied to the table 18 and its associated bracket 25 by the climb cutting operation. When this occurs, of course, the clutch housings 45 and 45A are forced into tight frictional engagement with the bracket 25 so that if the one way operation of the clutches 30 and 30A were lacking, the nut elements 28 and 28A would bind against the bracket 25 and a substantial torque would be required to release the nut elements. However, with the present invention, it is unnecessary to apply a torque sufficient to overcome the frictional forces between the clutch housings 45 and 45A and the bracket 25, because, as previously mentioned, clockwise rotation of the nut element 28, as viewed from the left in FIG. 4, will also effect clockwise rotation of the clutch hub 34 relative to its associated clutch housing 45. Therefore, the hub 34 of the clutch will rotate in the bearing 38 and the nut element 28 will rotate relative to the housing 45 on the bearing 53 whereby the torque applied to the nut elements 28 and 28A is only that which is necessary to overcome the friction that exists between the threads of the nut elements and the threads of the screw 21. When the nut elements rotate in a direction to release them from tight frictional engagement with the threads of the screw 21, they rotate relative to the housings 45 and 45A, and back away from the bracket 25. After a small amount of such rotation, the pressure on the housings 45 and 45A is released and the tight frictional engagement between the housings 45 and 45A is thereby released so that the housings 45 and 45A are again free to rotate with the nut elements 28 and 28A, respectively.

When the forces applied to the table 18 and its associated bracket 25 by conventional cutting operations are relieved, the spring 87 expands to urge the rack 72 to the right, as viewed in FIG. 3. Such rightward movement or the rack 72 effects clockwise rotation of the pinion 61, as viewed in FIG. 3, thereby causing the nut element 28 to rotate relative to the screw 21 in a counterclockwise direction and the nut element 28A to rotate in a clockwise direction, as viewed from the left in FIG. 4. As previously mentioned, in this direction of rotation, the clutch housings 45 and 45A rotate with the nut elements 28 and 28A, respectively, to slidably engage with the bracket 25. This action causes the threads of the nut assembly 27 to frictionally engage the threads of the screw 21 without significantly resisting the rotation of the screw but sufficiently to remove the backlash between the threads of the nut assembly and the screw. With the spring 87 thus functioning to remove the backlash, the mechanism is in condition to respond rapidly to climb cutting forces which may be applied to the table 18 to increase the frictional engagement between the threads of the nut assembly 27 and the threads of the screw 21 in the amount required to accommodate the particular climb cutting forces being applied.

For the purpose of describing the operation of the mechanism during a climb cutting operation, it will be assumed that the table 18 is being moved to the left in FIGS. 1 and 4 and the cutter 13 is rotating in a clockwise direction as viewed in FIG. 1. Such leftward movement of the table 18 requires a clockwise rotation of the screw 21 as viewed in FIG. 3 and from the left in FIG. 4. The engagement of the cutter 13 with the workpiece W in a climb cutting operation produces a force in the direction indicated by the arrow F in FIG. 4 which is in the same direction as the direction of table movement. The force F is therefore in the same direction as the force produced by the previous conventional cutting operation but the table 18 is now moving in the opposite direction. The climb cutting force will act on the table 18 and its associated bracket 25 to urge them in a leftward direction as viewed in FIG. 4. This force will be applied to the nut element 28A through the abutment 25, the housing 45A, the thrust washer 52A, the bearing 53A, the thrust washer 54A, and thence through the locking collar 55A to the nut element 28A, which force tends to move the nut element 28A to the left relative to the screw 21, as viewed in FIG. 4, causing the threads of the nut element 28A to tightly engage the threads of the screw 21. This produces a frictional force between the threads of the nut element 28A and the threads of the screw 21 to cause the nut element 28A and its associated gear portion 31A to rotate with the screw 21 in a clockwise direction, as viewed from the left in FIG. 4. Since the gear portion 31A of the nut element 28A is in meshing engagement with the pinion 62, it will cause the pinion to rotate in a counterclockwise direction. Counterclockwise rotation of the pinion 62 will effect clockwise rotation of the pinion 61 which, in turn, will cause the nut element 28 to rotate in a counterclockwise direction and towards the bracket 25, as viewed in FIG. 3 or from the left in FIG. 4, at a fast rate because of the simultaneous opposite rotation of the screw 21 and the nut element 28. As the nut element 28 rotates in a counterclockwise direction and moves towards the bracket 25, the hub 34 and housing 45 rotate with it as a unit, moving the housing 45 into tight frictional engagement with the bracket 25. The force developed between the housing 45 and the bracket 25 immediately reacts to cause the two nut elements 28 and 28A to tighten against the bracket 25 to place the portion of the screw between them in tension and thereby remove the backlash between the threads of the nut assembly 27 and the threads of the screw 21. As the climb cutting force increases, the nut elements 28 and 28A react to increase the tension on the screw and, as a result, increase the friction between the threads of the nut assembly 27 and the threads of the screw 21. This frictional engagement of the threads resists the rotation of the screw and thereby prevents the screw from being rotated as a result of the force applied to nut assembly 27 by the climb cutting force which would cause the screw to overrun its drive and produce an intolerable acceleration of the table.

During this tightening of the backlash eliminating mechanism, the clutch housings 45 and 45A rotate with the nut elements 28 and 28A and are forced against the bracket 25 while rotating to produce a sliding friction with the surface of the bracket 25. This sliding friction limits the tightening up process of the backlash eliminating mechanism to prevent unnecessarily high unit pressures on the threads of the nut elements and the screw and prevents the threads from wearing out prematurely while allowing the table to be moved by manual rotation of the screw when the table has been stopped in a heavy climb cut.

As the cutter leaves the workpiece after a climb cutting operation, the forces applied to the table by the climb cutting operation are terminated. Therefore, with the table 18 continuing to move to the left as viewed in FIG. 4, the forces which have been transmitted through the table and the bracket 25 to urge the nut element 28A leftwardly against the threads of the screw 21 have been eliminated. As a result, the tendency for the clockwise rotating screw 21 to rotate the nut element 28A with it is diminished. However, in view of the leftward movement of the table 18 without the presence of a climb cutting force, the driving force is transmitted from the screw through the nut element 28 to increase the friction between the threads of the nut element 28 and the threads of the screw 21. The clockwise rotating screw therefore urges the nut element 28 to rotate with it in the same clockwise direction as viewed from the left in FIG. 4. Such rotation of the nut element 28 is transmitted through the connecting gearing to effect rotation of the nut element 28A in the opposite direction.

The overrunning or one way clutch hubs 34 and 34A will rotate with the nut elements 28 and 28A, respectively, in a direction so that they rotate relative to the clutch housings 45 and 45A, as previously mentioned. With this arrangement it is unnecessary to overcome the frictional resistance between the bracket 25 and the clutch housings 45 and 45A when releasing the antibacklash mechanism. Such rotation of the nut elements 28 and 28A serves to back them away from the bracket 25 to relieve the pressure on the clutch housings 45 and 45A and release their tight frictional engagement with the bracket 25. As the nut elements 28 and 28A back away from the bracket 25, the forces which placed the portion of the screw 21 between the nut elements 28 and 28A in tension are terminated to reduce the friction between the threads of the nut assembly 27 and the screw 21 so that the latter may be readily rotated without overcoming the high resistance to its rotation which existed during the climb cutting operation.

Simultaneously with the adjustment that occurs in the nut elements because of the cutter leaving the workpiece, the rotation of the pinion 61 in a counterclockwise direction, as viewed in FIG. 3, will effect leftward movement of the rack 72. Such movement will continue until the compression on the spring 87 opposes such movement thereby limiting the adjustment occurring in the nut elements. At this time, the adjustment that has taken place will be such as to have relieved the high frictional engagement effected between the threads of the nuts 28 and 28A and the threads of the screw that occurred during the climb cutting operation. However, the resistance offered by the spring 87 prevents the nut elements 28 and 28A from being rotated excessively, so that the screw 21 is maintained under a predetermined amount of tension and the mechanism is maintained conditioned to immediately respond to oppose a climb cutting force.

As shown in FIG. 3, the length of the barrel 91 of the spring tension adjusting nut 90 is such as to provide a space between the head 81 of the plunger 80 and the end of the barrel 91. This space 95 is long enough to permit the rack 72 to move to the right within the bore 73 a sufficient amount to accommodate the tightening of the nut elements 28 and 28A against the bracket 25 during any climb cutting operation that may be performed on the machine so that there is no interference with the operation of the backlash eliminating mechanism. During the normal operation of the machine the spring 87 will urge the plunger 80 to the right a sufficient amount to remove the backlash between the threads of the nut assembly 27 and the screw without causing a significant increase in the friction between the engaged threads. However, the space 95 is long enough to permit further rightward movement of the rack 72 when a climb cutting operation is performed to enable the nut elements 28 and 28A to tighten up on the bracket 25 in the manner described to substantially increase the frictional resistance of the threads to rotation of the screw for preventing the climb cutting forces from causing the screw to overrun its drive.

The limiting mechanism 71 is adapted to selectively render the backlash eliminator mechanism inoperative and to this end includes a threaded shaft 101 which is engaged in an axial threaded opening 102 provided in the adjusting nut 90, as shown in FIG. 3. On its inner end, the threaded shaft 101 has secured thereto a positive stop element 103 which is movable into engagement with the axial end face of the tang 82 of the circular head 81 of the plunger 80. To effect a movement of the positive stop 103, the outer end of the threaded shaft 101 is provided with a hand knob 104 which is fastened to the outer end of the shaft 101 by means of a pin 105. Rotation of the manual knob 104 in a clockwise direction, as viewed from the right in FIG. 3, will effect rotation of the shaft 101 in a clockwise direction for moving the shaft axially inwardly to move the positive stop 103 against the face of the tang 82 and shift it as well as the rack 72 to the left, as viewed in FIG. 3, to its leftward limit of movement. Such axial movement of the rack 72 will cause a rotation of the gears 61 and 62 to rotate the nut elements in a direction to cause their axial movement away from the bracket 25 and thereby release the backlash eliminating mechanism so that there is no appreciable resistance to rotation of the screw 21. The external forces then applied to the table, as, for example, in a climb cutting operation, will not affect the backlash eliminating mechanism because the rack 72 is locked in its leftward position so that the nut elements 28 and 28A are unable to rotate to tighten up on the bracket 25. The backlash eliminating mechanism will therefore remain inoperative until the stop element 103 is shifted axially to its rightward position to permit a like rightward axial movement of the rack 72.

The improved automatic backlash eliminator described above is positive in action and efficient in operation and operates equally well with screws and nut elements that have become worn through use. This is true because the forces between the abutment 25 and the screw 21 are axially acting forces and therefore uneven wear of the screw 21 does not affect the operation of the automatic backlash eliminator nor does it impair its efficiency. The improved automatic backlash eliminator is particularly advantageous for performing climb cutting operations. When the improved system is set for this type of operation, the stop element 103 is fully retracted to its rightward position as shown in FIG. 3 so that it will not interfere with the rightward axial movement of the rack 72. Consequently, the nut assembly is free to tighten up in response to the particular climb cutting force present and the tightening up of the backlash eliminating mechanism is not dependent upon the condition of the threads of the nut elements and the screw. In the past it has been necessary to set backlash eliminating mechanism for operation on the unworn portion of the screw rather than with the worn portion of the screw. This was necessary because if set to operate on the worn portion of the screw, the nut assembly would bind and damage the mechanism when the unworn portions of the screw were engaged. It is apparent that with the apparatus of this invention there is no limitation imposed upon the tightening up process of the nut assembly in a climb cutting operation, except that which is imposed by the sliding friction developed between the housings 45 and 45A as they are rotatably moved into engagement with the adjacent end faces of the abutment 25. This sliding friction serves to prevent unnecessarily high unit pressure being imposed upon the threads of the nut elements and the screw.

From the foregoing detailed description of an automatic backlash eliminator, it is apparent that there has been provided an automatic backlash eliminator which automatically compensates for the cutting conditions to permit free relative rotation between the unit assembly and screw or which becomes effective in response to the climb cutting forces to eliminate the backlash and increase the friction between the threads of the nut assembly and screw by an amount dependent upon the forces developed in the climb cutting operation.

Furthermore, the automatic backlash eliminator of the present invention includes the advantages of sliding friction when the mechanism is tightening up to avoid excessive pressures but provides for rolling movement with a minimum of frictional resistance in the opposite direction to facilitate the release of the mechanism after a climb cutting operation.

The principles of this invention having now been fully explained in connection with the foregoing description, I hereby claim as my invention:

1. In a machine tool having a pair of machine members, one of which is movable relative to the other; an abutment carried by the first of the members and having an axial opening; a screw extending through the opening in said abutment and supported by the second of the members; a pair of nut elements threadedly engaged on said screw and rotatably carried by said abutment; drive means operably connected to produce relative rotation between said nut elements and said screw for driving the movable member in its path of travel; a pair of one way clutches mounted about said screw, each of said clutches being located between one of said nut elements and said abutment and connected to rotate with its associated nut element in the direction of rotation which produces axial movement of the nut element toward the abutment and relative to the screw; and means responsive to the external forces applied to the movable member to produce simultaneous rotation of said nut elements in opposite directions relative to said screw for tightening said nut elements against said abutment to increase the friction between the threads of said nut elements and said screw when the external forces tend to urge the movable member in a direction to overrun said drive means, said force responsive means being also operative to produce simultaneous rotation of said nut elements in opposite directions relative to said screw upon a change in the external forces to back the nut elements away from said abutment and thereby relieve the high friction between the threads of said nut elements and said screw; whereby said one way clutches will rotate with said nut elements when the latter are tightening up on said abutment so that said clutches will produce a sliding friction with said abutment to prevent excessive tightening of the nut elements, but said nut elements will rotate relative to said clutches in the opposite direction so that the frictional engagement of said clutches with said abutment will not interfere with the release of the threads of the nut elements from tight frictional engagement with the threads of said screw.

2. In a machine tool having a pair of machine members, one of which is movable relative to the other; an abutment having an axial opening carried by one of the machine members; a screw extending through the opening in said abutment and supported by the other of the machine members; a pair of nut elements threadedly engaged on said screw and disposed on opposite sides of said abutment; drive means operably connected to produce relative rotation between said nut elements and said screw for effecting movement of the movable machine member in its path of travel; a pair of one way clutches mounted about said screw and disposed on opposite sides of said abutment, each of said clutches being operably connected to rotate with an associated nut element in the direction of rotation which produces axial movement of said nut element towards said abutment relative to said screw; means operably connected to said nut elements to effect their simultaneous rotation in opposite directions relative to said screw, said means being responsive to external forces applied to the movable machine member to tighten said nut elements against said abutment to increase the fraction between the threads of said nut elements and the threads of said screw when the external force tends to urge the movable machine member in a direction to overrun said drive means, said force responsive means also being operable in response to a change of the external force to produce simultaneous rotation of said nut elements in opposite directions relative to said screw in directions to back said nut elements away from said abutment to thereby relieve the high frictional engagement between the threads of said nut elements and the threads of said screw; and resilient means operably connected to said force responsive means to limit the operation of the latter when it operates in response to a change in the external force to produce simultaneous opposite rotation of said nut elements in directions to back said nut elements away from said abutment so that frictional engagement between the threads of said nut elements and the threads of said screw is maintained in an amount sufficient to eliminate backlash between said nut elements and said screw; whereby said one way clutches will rotate with said nut elements when the latter are tightening up on said abutment so that said clutches will produce a sliding friction with said abutment to prevent excessive tightening of said nut elements but said nut elements are free to rotate relative to said clutches in the opposite direction so that the frictional engagement of said clutches with said abutment will not be a factor when said nut elements are rotated to release the threads thereof from tight frictional engagement with the threads of said screw and such rotation of said nut elements in the direction of release is limited by said resilient means to maintain the system free of backlash.

3. In a machine tool having a pair of machine members one of which is movable relative to the other; an abutment having an axial opening carried by one of the machine members; a screw extending through the opening in said abutment and carried by the other of the machine members; a pair of nut elements threadedly engaged on said screw on opposite sides of said abutment; drive means operably connected to produce relative rotation between said nut elements and said screw for driving the movable machine member in its path of travel; a pair of antifriction bearings mounted in said abutment in the ends of the opening therein and extending outwardly thereof; a one way clutch associated with each of said nut elements, each of said one way clutches comprising an inner member mounted on an associated nut element and connected thereto for rotation with it, said inner member being journalled in said anti-friction bearing; an outer member centered on an adjacent antifriction bearing in position to be connectable with said inner member for rotation with it; connecting means operable to connect said inner clutch member to the associated outer clutch member upon rotation of said associated nut element in the direction of rotation which produces axial movement of the nut element toward the abutment and relative to said screw, said connecting means operating to release said inner from said outer member upon rotation of said associated nut element in the direction of rotation which produces axial movement of the nut element away from said abutment and relative to said screw; means responsive to the external forces applied to the movable member to produce simultaneous rotation of said nut elements in opposite directions relative to said screw for tightening said nut elements against said abutment to increase the friction between the threads of said nut elements and the threads of said screw when the external forces tend to urge the movable machine member in a direction to overrun said drive means, said force responsive means also being operative to produce simultaneous rotation of said nut elements in opposite directions relative to said screw upon a change in the external forces to back the nut elements away from said abutment and thereby relieve the high friction between the threads of said nut elements and the threads of said screw; resilient means operably connected to said force responsive means to limit the operation of the latter when it operates to release said nut elements from tight frictional engagement with the threads of said screw so that the threads of said nut elements are maintained in frictional engagement with the threads of said screw but in an amount just sufficient to eliminate backlash between said nut elements and said screw; and means operable when actuated to overcome the action of said resilient means and to operate said force responsive means in a direction to rotate said nut elements in direction away from said abutment to establish backlash between said nut elements and said screw; whereby said one way clutches will rotate with said nut elements when the latter are tightening up on said abutment so that the outer members thereof are engaged with opposite ends of said abutment to produce a sliding friction therewith to prevent excessive tightening of the nut elements, but said nut elements will rotate relative to their associated outer members in said antifriction bearings in the opposite direction so that the friction engagement of said outer clutch members with said abutment will not interfere with the release of the threads of the nut elements from tight frictional engagement with the threads of said screw and such release will be limited by said resilient means to maintain the nut and screw mechanism free of backlash.

4. In a machine tool having a pair of machine members, one of which is movable relative to the other; an abutment having an axial opening thereon carried by one of the members; a screw extending through the opening in said abutment and supported by the other of said members; a pair of nut elements threadedly engaged on said screw and rotatably supported by said abutment; drive means operably connected to produce relative rotation between said nut elements and said screw for effecting movement of the movable member in its path of travel; a pair of one way clutches mounted about said screw and associated with said nut elements, each of said clutches having an inner driving member connected to rotate with its associated nut element and being antifrictionally journalled in an adjacent end of the opening provided in said abutment; an outer driven member arranged to be driven by said driving member in one direction of rotation of the latter and disposed so as to be slidably engaged with the adjacent end of said abutment when so rotated; and means responsive to the external forces applied to the movable machine member to produce simultaneous rotation of said nut elements in opposite directions relative to said screw for slidably engaging said driven clutch members with said abutment to increase the friction between the threads of said nut elements and said screw when the external forces tend to urge the movable machine member in a direction to overrun said drive means, said force responsive means also being operative to produce simultaneous rotation of said nut elements in opposite directions relative to said screw upon a change in the external forces to back said nut elements away from said abutment and thereby relieve the high friction between the threads of said nut elements and said screw; whereby said one way clutches will rotate with said nut elements when the latter are tightening up so that said outer drive members of said clutches will produce a sliding friction with said abutment to prevent excessive tightening of said nut elements, but said nut elements and the associated clutch driving members will rotate relative to the outer driven members of said clutches in the antifriction bearings in the opposite direction so that the frictional engagement of the outer driven members of said clutches with said abutment will not interfere with the release of the threads of the nut elements from tight frictional engagement with the threads of said screw.

5. In a machine tool having a pair of machine members, one of which is movable relative to the other; an abutment having an axial opening carried by the first of the machine members; a screw extending through the opening in said abutment and supported by the second of the machine members; a pair of nut elements threadedly engaged on said screw on opposite sides of said abutment and antifrictionally journalled in opposite ends of the opening in said abutment; drive means operably connected to produce relative rotation between said nut elements and said screw for driving the movable machine member in its path of travel; a pair of one way clutches mounted about said screw, each of said clutches being connected to rotate with an associated nut element in the direction of rotation which produces axial movement of the nut element towards said abutment and relative to said screw; gearing interconnecting said nut elements for simultaneous opposite rotation, said gearing being responsive to the external forces applied to the movable machine member to produce simultaneous opposite rotation of said nut elements relative to said screw for rotating said one way clutches into sliding frictional engagement with said abutment to thereby increase the friction between the threads of said nut elements and said screw when the external forces tend to urge the movable machine member in a direction to overrun said drive means, said gearing also being operative to produce simultaneous opposite rotation of said nut elements relative to said screw and relative to said clutches upon a change in the external forces to back said nut elements away from said abutment to relieve the high friction between the threads of said nut elements and said screw without the necessary of overcoming the friction between said clutches and said abutment; and resilient means normally acting on said gearing for biasing said nut elements in opposite directions of rotation relative to said screw in directions of rotation which tend to move said nut elements axially towards said abutment for maintaining the relationship between said nut elements and said screw free of backlash; whereby the system is maintained free of backlash and said gearing responsive instantaneously to external forces applied to the movable machine member which tend to move the latter in a direction to overrun said drive means to increase the friction between the threads of said nut elements and said screw which is prevented from being excessive by the sliding friction produced by the rotational engagement of said clutches with said abutment, but said nut elements will rotate relative to said clutches in the opposite direction so that the frictional engagement of said clutches with said abutment is not a factor when said nut elements are rotated to release the threads of the nut elements from tight frictional engagement with the threads of said screw.

6. In a machine tool having a pair of machine members, one of which is movable relative to the other; an abutment having an axial opening carried by one of the machine members; a screw extending through the opening in said abutment and supported by the other of the machine members; a pair of nut elements threadedly engaged on said screw on opposite sides of said abutment and rotatably supported therein; drive means operably connected to produce relative rotation between said nut elements and said screw for driving the movable machine member in its path of travel; a pair of one way clutches mounted about said screw, each of said clutches being located between one of said nut elements and said abutment and connected to rotate with its associated nut element in the direction of rotation which produces axial movement of the nut element towards said abutment and relative to said screw; means responsive to the external forces applied to the movable machine member to produce simultaneous rotation of said nut elements in opposite directions relative to said screw for tightening said nut elements against said abutment to increase the friction between the threads of said nut elements and said screw when the external forces tend to urge the movable machine member to overrun said drive means, said force responsive means also being operable to produce simultaneous rotation of said nut elements in opposite directions relative to said screw upon a change in the external forces to back the nut elements away from said abutment and thereby relieve the high friction between the threads of said nut elements and said screw; resilient means operably connected to act on said force responsive means to limit the operation of said force responsive means when it operates to back said nut elements away from said abutment to maintain said nut elements and said screw free of backlash; and a manual selector positionable into one or the other of two positions, said selector when in its first position being operable to overcome said resilient means and act on said force responsive means to effect its operation to back said nut elements away from said abutment in an amount sufficient to establish backlash between said nut elements and said screw so that said drive means in effecting movement of the movable machine member in a conventional cutting operation is not opposed by additional frictional forces, said selector when positioned into the second of its two positions operating to disengage from said force responsive means and to release said resilient means so that said resilient means reacts to effect operation of said force responsive means to rotate said nut elements in opposite directions of rotation to engage said nut elements against said abutment for eliminating the backlash between said nut elements and said screw to thereby condition said force responsive means so that it will react to the external forces applied to the movable machine member in a climb cutting operation to tighten said nut elements against said abutment to increase the friction between the threads of said nut elements and said screw; whereby said force responsive means may be selectively conditioned for conventional cutting operations or for climb cutting operations and when in the latter condition said one way clutches will rotate with said nut elements when the latter are tightening up on said abutment so that said clutches will produce a sliding friction with said abutment to prevent excessive tightening of said nut elements, but said nut elements will rotate relative to said clutches in the opposite direction so that the frictional engagement of said clutches with said abutment will not interfere with the release of the threads of the nut elements from tight frictional engagement with the threads of said screw.

7. In a mechanism for eliminating backlash in a drive assembly which is connected to effect relative movement between two members of a machine; an abutment fixed to the first of the machine members, a screw rotatably supported by the second machine member, means operatively connected to rotate said screw for effecting relative movement between said machine members, a pair of nut elements in threaded engagement with said screw, means interconnecting said nut elements for simultaneous rotation in opposite directions relative to said screw to effect their simultaneous axial movement toward and away from said abutment, a pair of thrust bearings each of which is supported for axial movement with one of said nut elements in position to be moved into tight engagement with said abutment to place the portion of the screw between said nut elements in tension for eliminating the backlash between the threads of said screw and said nut elements, and clutch means connecting said thrust bearings for rotation with their associated nut elements when the latter are rotated in directions to effect their movement toward said abutment, said clutch means operating to release said nut elements for rotation independent of said thrust bearings when said nut elements are rotated in directions to effect their movement away from said abutment to thereby facilitate the release of said thrust bearings from tight engagement with said abutment.

8. In a mechanism for eliminating backlash in a drive assembly which is connected to effect relative movement between two members of a machine tool; an abutment fixed to the first of the machine tool members, a screw rotatably supported by the second machine tool member, a pair of nut elements in threaded engagement with said screw, means interconnecting said nut elements for simultaneous rotation in opposite directions relative to said screw to effect their simultaneous axial movement toward and away from said abutment, a pair of one-way clutches each being mounted for rotational and axial movement with one of said nut elements, and a thrust bearing supported by each of said one-way clutches for axial movement therewith toward and away from said abutment and being rotatable with said one-way clutches when their associated nut elements are rotated in directions to move said bearings axially into engagement with said abutment, said one-way clutches being rotatable independently of said bearings when their associated nut elements are rotated in the reverse directions to effect their axial movement away from said abutment, whereby the rotation of said nuts in directions to relieve a tight engagement between said thrust bearings and said abutment is facilitated.

References Cited in the file of this patent

UNITED STATES PATENTS

| | | |
|---|---|---|
| 525,780 | Boynton | Sept. 11, 1894 |
| 2,191,131 | Martellotti | Feb. 20, 1940 |